United States Patent
Chambers et al.

[11] Patent Number: 5,915,103
[45] Date of Patent: Jun. 22, 1999

[54] METHOD AND SYSTEM FOR AN EXTENSIBLE ON SILICON BUS SUPPORTING MULTIPLE FUNCTIONAL BLOCKS

[75] Inventors: Peter Chambers, Scottsdale; Edward Michael Petryk, Pheonix; Scott Edward Harrow, Scottsdale, all of Ariz.

[73] Assignee: VLSI Technology, Inc., San Jose, Calif.

[21] Appl. No.: 08/760,701

[22] Filed: Dec. 5, 1996

[51] Int. Cl.[6] .................................................. G06F 13/00
[52] U.S. Cl. ......................... 395/306; 395/280; 395/290; 364/490
[58] Field of Search .................................. 395/306, 308, 395/309, 281, 280, 290; 364/490

[56] References Cited

U.S. PATENT DOCUMENTS

| | | | |
|---|---|---|---|
| 5,017,993 | 5/1991 | Shibata | 257/370 |
| 5,068,823 | 11/1991 | Robinson | 395/500 |
| 5,551,075 | 8/1996 | Caux et al. | 455/333 |
| 5,585,745 | 12/1996 | Simmons et al. | 326/93 |
| 5,655,142 | 8/1997 | Gephardt et al. | 395/800.32 |
| 5,694,614 | 12/1997 | Bennett | 395/309 |

*Primary Examiner*—Gopal C. Ray
*Attorney, Agent, or Firm*—Wagner, Murabito & Hao

[57] ABSTRACT

The present invention comprises a multiple functional block integrated circuit device for connecting to an external peripheral component interconnect (PCI) bus. The present invention includes an integrated circuit adapted to be coupled to an external PCI bus. The integrated circuit includes a plurality of functional blocks. Each of the plurality of functional blocks performs a function and comprises either a master functional block or a target functional block. A target bus adapted to transmit data signals is integral with the integrated circuit. The target bus is coupled to each of the plurality of functional blocks. A master bus adapted to transmit data signals is also integral with the integrated circuit. The master bus is coupled to each master functional block. A target bus interface integral with the integrated circuit is coupled to the target bus. The target bus interface is adapted to be coupled to the external PCI bus and to each of the plurality of functional blocks and interfaces each of the plurality of functional blocks to the external PCI bus. A master bus interface integral with the integrated circuit is coupled to the master bus. The master bus interface is adapted to be coupled to the external PCI bus and to each master functional block and interfaces each master functional block to the external PCI Bus.

18 Claims, 10 Drawing Sheets

METHOD AND SYSTEM FOR AN EXTENSIBLE ON SILICON BUS SUPPORTING MULTIPLE FUNCTIONAL BLOCKS

TECHNICAL FIELD

The field of the present invention pertains to the field of computer system bus architectures. More particularly, the present invention relates to an on-chip bus architecture supporting many functional blocks on a single semiconductor die.

BACKGROUND ART

A bus architecture of a computer system conveys much of the information and signals involved in the computer system's operation. One or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. In many hardware applications, such as, graphics adapters, full motion video adapters, small computer systems interface (SCSI) host bus adapters, and the like, it is imperative that large block data transfers be accomplished expeditiously. These applications are just some examples of subsystems which benefit substantially from a very fast bus transfer rate. In many computer system architectures of today, the majority of the above mentioned subsystems reside on the computer system's expansion bus.

The expansion bus is generally used as a method of adding functional components to the computer system. The functional components are physically coupled to the expansion bus, and use the expansion bus to communicate and exchange information. Dedicated bus-based designs (designs specifically conceived to operate from an expansion bus) typically embody the functional components. The peripheral component interconnect (PCI) bus is the expansion bus architecture upon which many dedicated bus-based designs are conceived. The PCI bus and its accompanying specification is an industry standardized, widely known, and widely supported expansion bus architecture.

Figure 1:
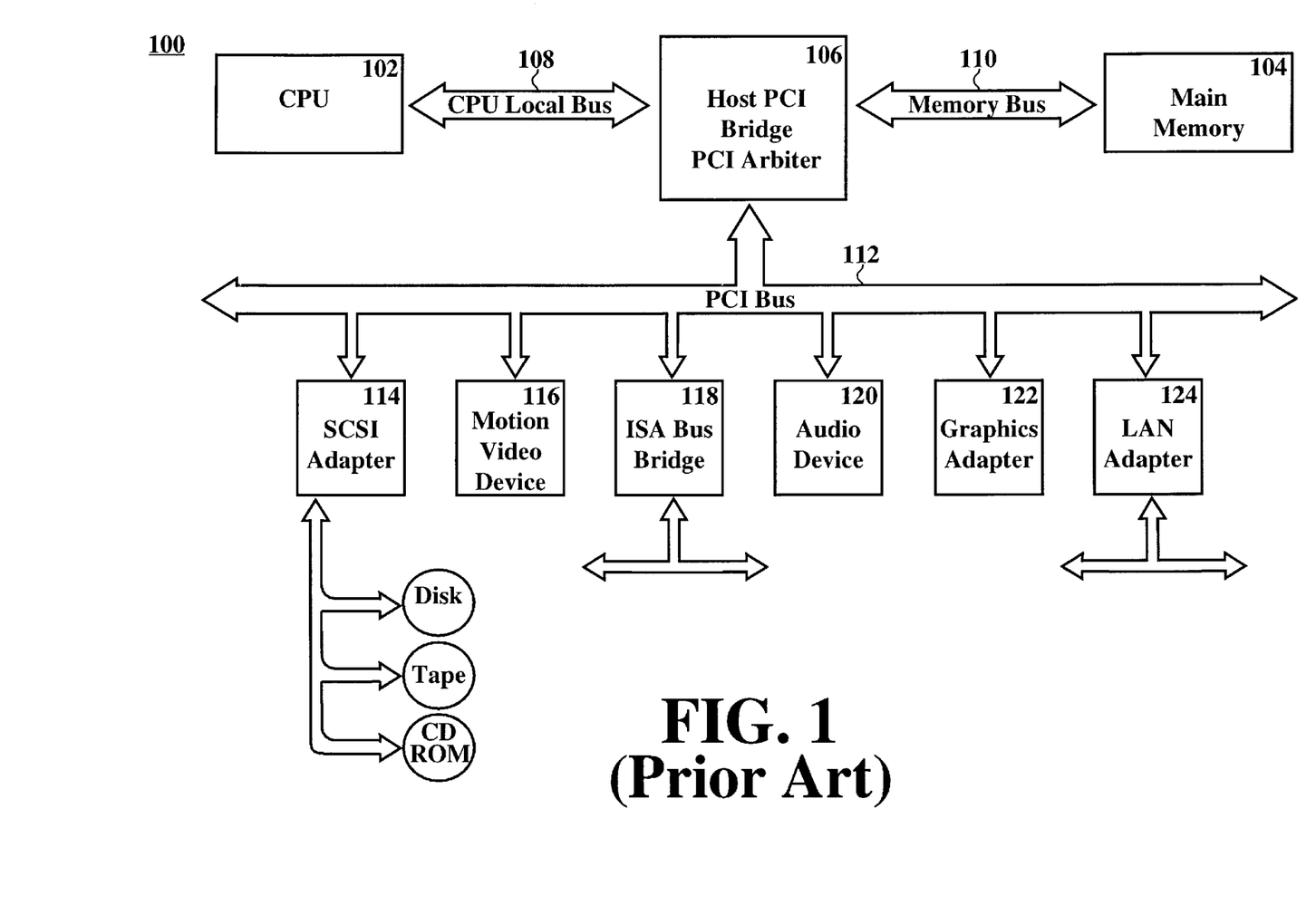
FIG. 1 shows a typical PCI bus architecture of the prior art.

Prior art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is additionally coupled to arbiter 106.

Referring still to prior art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, e.g., interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates a transaction (e.g., data transfer) with a "target device" or destination device (e.g., main memory 104). The PCI agent granted PCI bus ownership is referred to as the "initiator device" or simply, the initiator.

Figure 2:
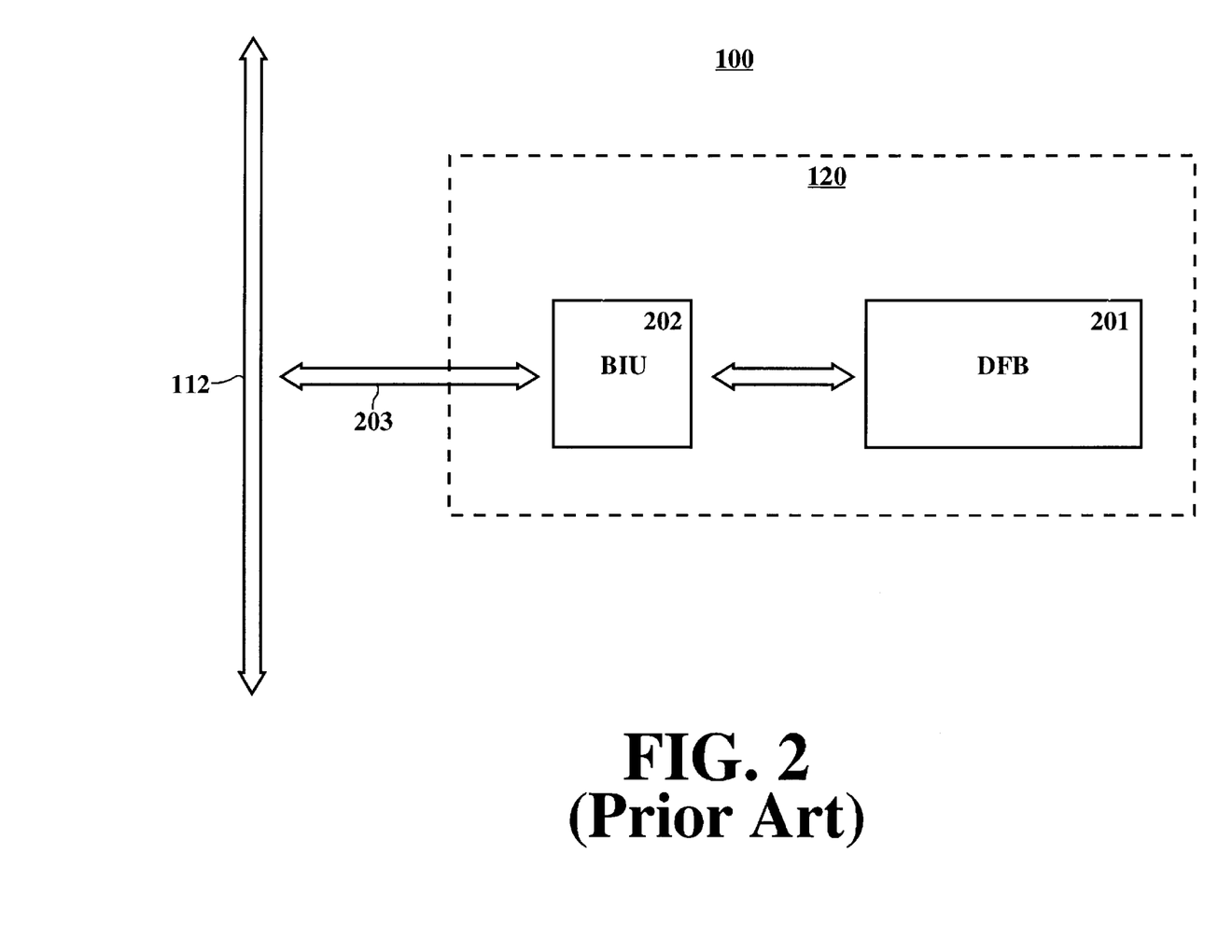
FIG. 2 shows an exemplary PCI agent of the PCI bus architecture shown in FIG. 1.

Prior art FIG. 2 shows an exemplary PCI agent 120 of PCI bus architecture 100. PCI agent 120 includes a device functional block 201 coupled to a bus interface unit 202. The bus interface unit is, in turn, coupled via connector 203 to the PCI bus 112. The bus interface unit (BIU) 202 manages the signals and protocols which comprises the PCI specification and describe how PCI agents use a PCI bus. The device functional block (DFB) 201 actualizes the function or functions PCI agent 120 is designed to accomplish (in this case, an audio device). DFB 201 includes the memory components, amplifiers, output drivers, and the like, required to implement the designed function. DFB 201 relies upon the BIU 202 to access PCI bus 112. The connector 203 couples the BIU 202 to the PCI bus 112. In so doing, the connector 203, and thus PCI agent 200, occupy one of the number of PCI slots of PCI bus 112.

The BIU 202, in order to properly interface DFB 201 with PCI bus 112, implements the functions and protocols defined in the PCI bus specification. BIU 202 also complies with all the rules governing communication across PCI bus 112. The PCI bus specification is relatively complex and timing wise aggressive in comparison to prior bus specifications. As such, designing a new DFB and a new corresponding BIU which will function correctly in a PCI bus environment is a non-trivial task. For example, the unique requirements of DFB 201, i.e., unique configuration requirements, device specific initiator requirements, and target requirements, need to be accounted for by BIU 202 in order to properly interface with PCI bus 112. In the same manner, DFB 201 is typically designed with the performance characteristics and limitations of the PCI specification, and as such, the BIU 202, in mind in order to ease the task of designing an adequate BIU. This facilitates the combining of the two functions, the BIU 202 and the DFB 201, into a single cohesive design. Because of this mutual dependence, the line between the BIU and the DFB is often blurred. The design of one unit becomes very much intertwined with and dependent upon the design of the other.

There is a problem, however, in the fact that a typical PCI bus (e.g., PCI bus 112) can usually support only a limited number of PCI agents. Once the limited number of PCI bus slots are occupied, it becomes expensive to add new PCI agents. If more PCI agents are desired, a hierarchical bridge to a subordinate PCI bus, which will accommodate its own set of PCI agents, is typically incorporated. The disadvantages of this solution include the added expense of the chipset implementing the PCI-to-PCI bridge function and the bus transfer latencies added to the PCI agents on the subordinate bus. Many manufacturers have turned to systems and methods for sharing a single one of the limited number of PCI bus slots among multiple PCI agents. Such systems and methods combined multiple PCI agents, or more particularly, the functions embodied by the PCI agents, into a single multi-agent device.

Figure 3:
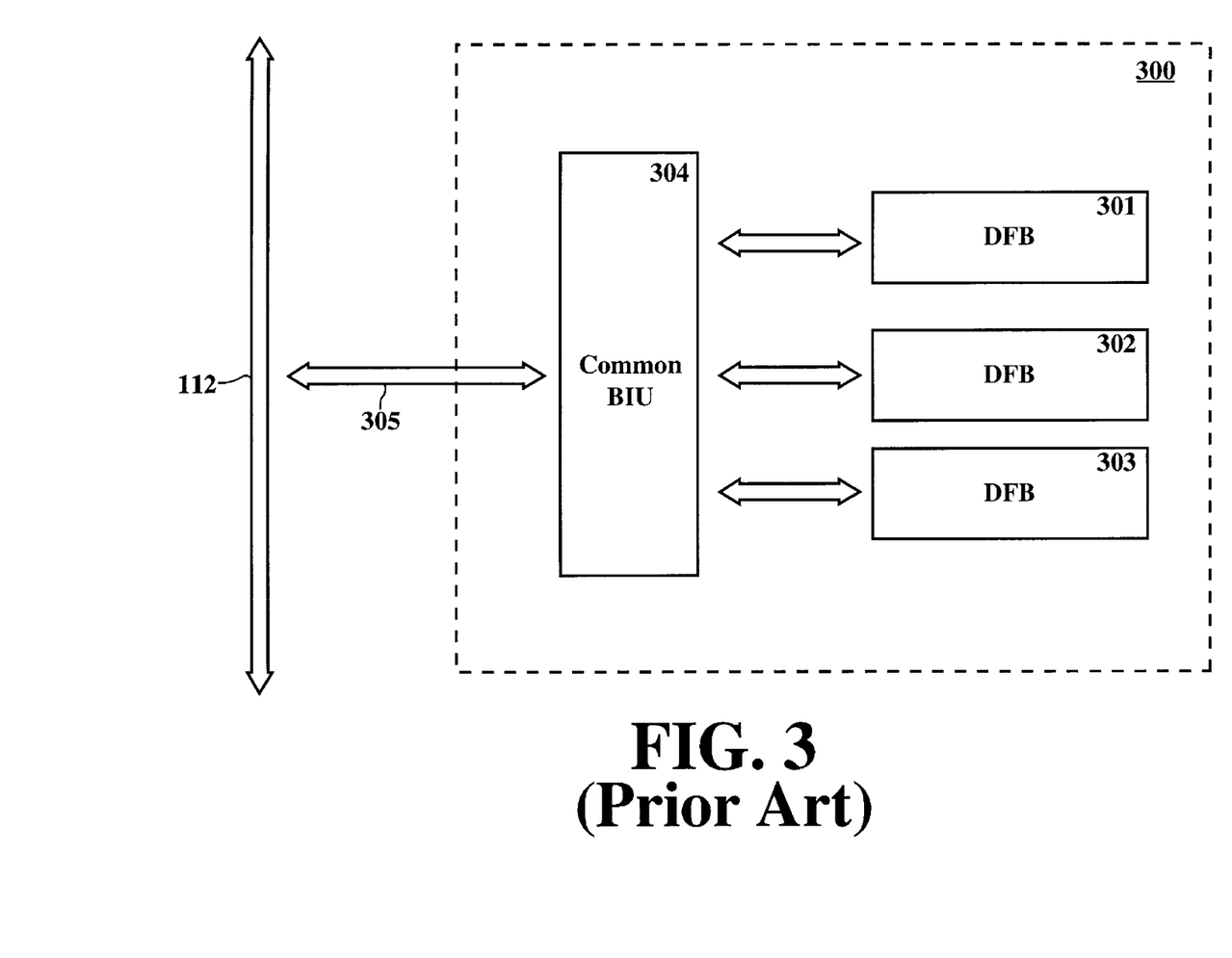
FIG. 3 shows one prior art multi-agent device for sharing a single PCI slot among multiple pre-existing PCI agents.

Prior art FIG. 3 shows one prior art multi-agent device 300 sharing a single PCI slot among multiple pre-existing PCI agents. Device 300 includes a plurality of DFBs 301, 302, and 303 (hereafter DFBs 301–303). Each of DFBs 301–303 are coupled to a common BIU 304. The common BIU 304 is coupled to PCI bus 112 via bus connector 305, thus occupying one of the limited number of PCI bus slots of PCI bus 112. Device 300 combines a number of DFBs into a single multi-agent device 300. Each of DFBs 301–303 share the common BIU 304. Many manufacturers take advantage of the rapid progress of integrated circuit technology and integrate multi-agent device 300 into a single semiconductor die.

The DFBs 301–303 need to adequately interface with the PCI bus 112 and comply with the PCI specification in order to function properly. The common BIU 304 performs the necessary interfacing with PCI bus 112 such that each of DFBs 301–303 are able to access the PCI bus 112. As such, common BIU 304 should be designed from the beginning with multiple agent support in mind. Where a BIU supports a single DFB, as described in the discussion of FIG. 2, the design of the BIU is tailored to the specific requirements of the single DFB. Where a BIU supports multiple DFBs, however, the task of designing a common BIU, which properly interfaces the multiple DFBs, becomes more complex. Such a BIU needs to support multiple DFBs, and thus, the design of the BIU needs to be tailored to the specific requirements of the multiple DFBs. Instead of designing to interface a single DFB and its particular requirements (as in FIG. 2), the common BIU 304 is designed to interface each of the multiple DFBs 301–303 and each of their particular requirements. If an additional number of DFBs are added, the complex common BIU 304 typically needs to be tailored for each additional DFB added to the multi-agent device 300. The complex common BIU 304 makes extension, or increasing the number of DFBs built into multi-agent device 300, more difficult.

To make the task of tailoring the common BIU more manageable, each of the DFBs 301–303 are designed to interface with the complex common BIU 304. This ensures compatibility with the common BIU 304, and eases the task of integrating the DFBs and the common BIU 304 into a single, functioning, bug-free, multi-agent device 300. By designing the DFBs 301–303 to interface with the complex BIU 304, however, a significant portion of design resources which could be used to design each of the DFBs 301–303 is spent ensuring each of the DFBs 301–303 will interface properly with the complex, common BIU 304.

Designing each of DFBs 301–303 to interface with common BIU 304 consumes significantly more time and effort than designing a DFB to interface with its own dedicated, relatively simple, BIU. Some prior art systems simply combine a number of BIU-DFB devices into a single integrated device, where each DFB comprising the device includes a dedicated BIU. Such integrated solutions essentially duplicate the PCI bus functions "on-chip." When combining existing designs into a single multi-agent (or more particularly, multi-block) device, such a solution is workable. When designing a new system, however, such a solution is inefficient and wasteful. Fabricating a separate BIU for each on-chip DFB is wasteful. Fabricating a majority of the PCI bus functions on-chip is wasteful. Where a design objective for a new system is efficiency, separate dedicated BIUs and complex on-chip PCI bus systems are not desired.

Thus, what is desired is a system for combining multiple functional blocks into a single integrated circuit in an efficient manner. Such a system should be easily extensible and should be capable of supporting a large number of on-chip functional blocks. Many multi-block devices are combinations of existing functional blocks, which vary little, if at all, between successive generations. Thus, what is further desired is a system which facilitates the efficient reuse of existing designs, requiring minimal custom tailoring of functional blocks in order to integrate them into a single multi-block system, and permits rapid design and fabrication of new multi-block devices. The method and system of the present invention satisfies the above needs.

DISCLOSURE OF THE INVENTION

The present invention comprises a multiple functional block integrated circuit device for connecting to an external peripheral component interconnect (PCI) bus. The present invention includes an integrated circuit adapted to be coupled to an external PCI bus. The present invention further includes a plurality of functional blocks integral with the integrated circuit. Each of the plurality of functional blocks perform a function in the multiple functional block integrated circuit device and each of the plurality of functional blocks comprise either a master functional block or a target functional block. A target bus adapted to transmit data signals is integral with the integrated circuit. The target bus is coupled to each of the plurality of functional blocks. A master bus adapted to transmit data signals is also integral with the integrated circuit. The master bus is coupled to each master functional block of the plurality of functional blocks. A target bus interface integral with the integrated circuit is coupled to the target bus. The target bus interface is coupled to the external PCI bus and is further coupled to each of the plurality of functional blocks via the target bus. The target bus interface interfaces each of the plurality of functional blocks to the external PCI bus. A master bus interface integral with the integrated circuit is coupled to the master bus. The master bus interface is coupled to the external PCI bus and is further coupled to each master functional block of the plurality of functional blocks via the master bus and interfaces each master functional block to the external PCI Bus.

In this manner, the present invention provides a system for combining multiple functional blocks into a single IC in an efficient manner. The system of the present invention is easily extensible and capable of supporting a large number of on-chip functional blocks. The present invention facilitates the efficient reuse of existing functional block designs. Functional block designs require minimal tailoring for integration into a single multiple functional block system, permitting rapid design and fabrication of new multiple functional block devices. The efficient extensible system of the present invention enables a method of implementing "drag and drop PCI" where functional block designs are quickly and easily integrated into a multiple functional block device. The designs of the functional blocks are easily interfaced with the target bus and master bus of the present invention. The method of the present invention enables engineers to design functional blocks to a standardized, simple, easily extensible bus interface each time they design a new functional block, and thus, save large amounts of time and resources, and greatly decrease the time period between conception of a new multiple functional block IC device in accordance with the present invention and fabrication of the device.

BRIEF DESCRIPTION OF THE DRAWINGS

The present invention is illustrated by way of example and not by way of limitation, in the figures of the accompanying drawings and in which like reference numerals refer to similar elements and in which.

BEST MODE FOR CARRYING OUT THE INVENTION

A method and system for an extensible on silicon bus supporting multiple functional blocks is disclosed. In the following description, for the purposes of explanation, numerous specific details are set forth in order to provide a thorough understanding of the present invention. It will be obvious, however, to one skilled in the art that the present invention may be practiced without these specific details. In other instances, well-known structures, devices, and processes are shown in block diagram form in order to avoid unnecessarily obscuring the present invention.

The present invention comprises a multiple functional block integrated circuit system for connecting to an external peripheral component interconnect (PCI) bus. The present invention includes an integrated circuit (IC) adapted to be coupled to an external PCI bus. A plurality of functional blocks are integrated into the IC. Each of the functional blocks perform a function in the multiple functional block IC device and each of the plurality of functional blocks comprise either a master functional block or a target functional block, analogous to master and target PCI agents. A target bus is integrated into the IC and is coupled to each of the functional blocks. A master bus is also integrated into the IC and is coupled to each master functional block of the plurality of functional blocks. The IC includes a target bus interface coupled to the target bus and a master bus interface coupled to the master bus. The target bus interface interfaces each of the plurality of functional blocks to the external PCI bus and the master bus interfaces the master functional blocks to the external PCI bus.

The target bus and the master bus are simple, demultiplexed, synchronous busses. As such, they are capable of supporting many functional blocks on a single IC. Many prior art multi-function devices have numerous separate on-chip functions. Often, it is desirable for these functions to be easily migrated from one design to another. In order to make this as simple as possible, an architecture of hierarchical on-chip target and master busses have been created. The target bus and the master bus both have straightforward interconnect protocols to minimize the effort of porting designs, both new functional block designs and existing functional block designs, to the target and master busses. The target and master busses are hierarchical in nature with straight forward interconnect protocols. The simple straight forward structure of the target and the master busses minimize the effort of "porting" functional block designs (both new designs and pre-existing designs) to the busses. External to the IC, these busses interface to the industry standard PCI bus, complying with the industry standard PCI specifications.

In this manner, the multiple functional block IC system of the present invention accomplishes the interconnectivity of multiple functional blocks with a reusable, extensible, and efficient bus system. In typical prior art single function systems, the bus interfaces (often referred to as common bus interface units) were custom designed for the functional block combined into the prior art single function system. In typical prior art multi-block systems, where several functional blocks are combined, the common bus interface unit is custom tailored to match the requirements of each of the functional blocks integrated into the prior art multi-block system. The efficient extensible system of the present invention enables a method of implementing "drag and drop PCI" where functional block designs are quickly and easily integrated into a multiple functional block device. The designs of the functional blocks are easily interfaced with the target bus and master bus of the present invention. The method of the present invention enables engineers to design functional blocks to a standardized, simple, easily extensible bus interface each time they design a new functional block, thus, saving large amounts of time and resources, and greatly decreasing the time period between conception of a new multiple functional block IC device in accordance with the present invention and fabrication of the device. The multiple functional block IC system of the present invention and its benefits are described in greater detail below.

Figure 4:
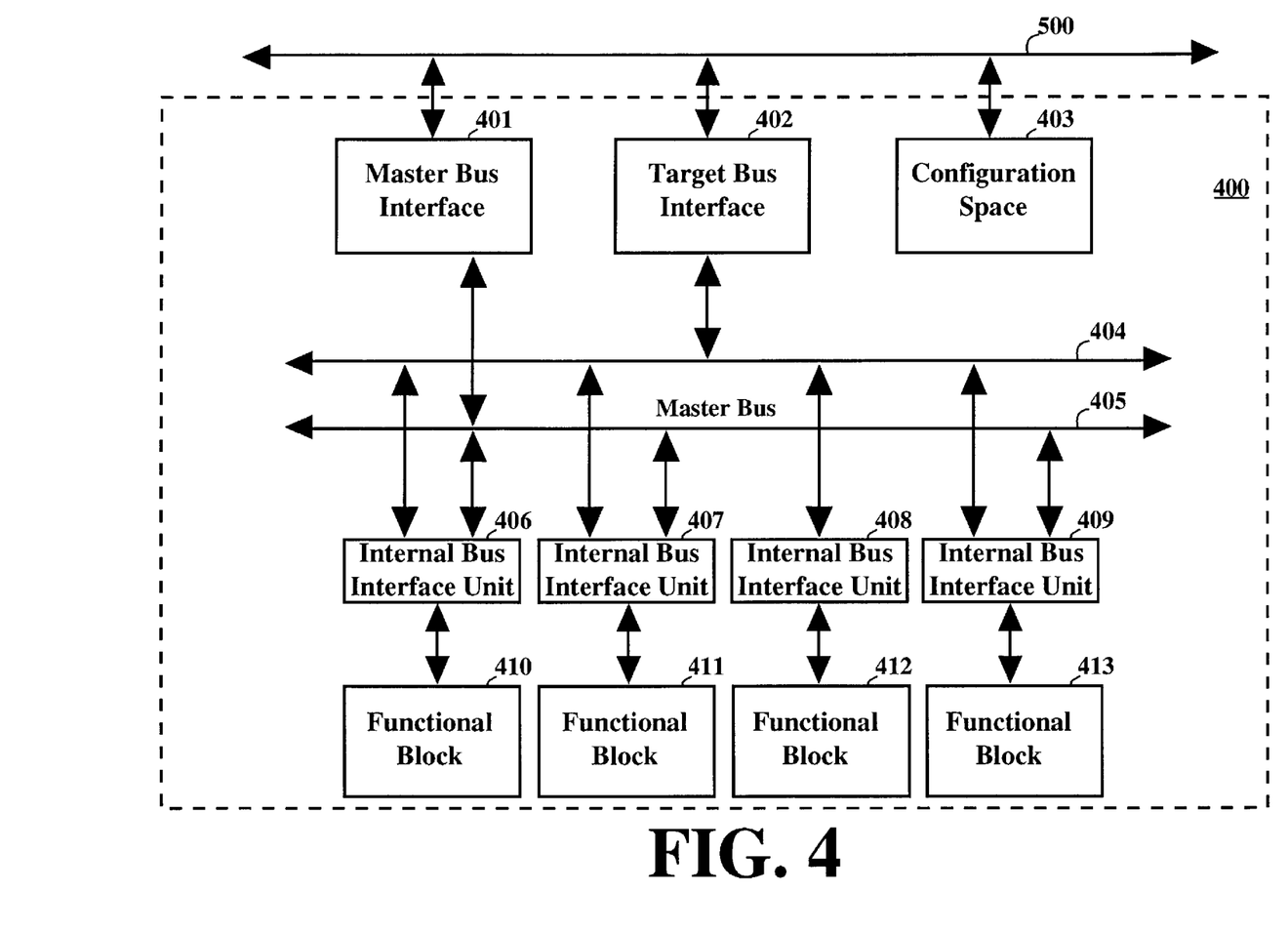
FIG. 4 shows a multiple functional block integrated circuit device in accordance with one embodiment of the present invention coupled to an external PCI bus.

FIG. 4 shows a multiple functional block IC device 400 in accordance with one embodiment of the present invention coupled to an external PCI bus 500. External PCI bus 500 is coupled to a master bus interface (MBI) 401, a target bus interface (TBI) 402, and a configuration space unit (CSU) 403. The MBI 401 and TBI 402 are coupled to a target bus 404 and a master bus 405. A plurality of functional blocks, functional block 410, functional block 411, functional block 412, and functional block 413 (hereafter functional blocks 410–413) are included in the IC device 400. Functional block 410, functional block 411, and functional block 413 are "master" functional blocks, analogous to bus master PCI agents, and are coupled to both the master bus 405 and the target bus 404. Functional block 412, however, is a "target" functional block, analogous to a target PCI agent, and is therefore coupled only to the target bus 404. Each of the functional blocks 410–413 are coupled to the master bus 405 and/or target bus 404 via internal bus interface unit 406, internal bus interface unit 407, internal bus interface unit 408, and internal bus interface unit 409 (hereafter internal bus interface units 406–409).

Referring still to FIG. 4, the IC device 400, in accordance with one embodiment of the present invention, has a number of primary characteristics. One characteristic is that both the target bus 404 and the master bus 405 are simple, demultiplexed busses. The external PCI bus 500, in compliance with the PCI specification, is a multiplexed bus, such that address signals and data signals share the same physical lines. Inside IC device 400, address and data signals are demultiplexed such that target bus 404 and master bus 405 each have separate, dedicated address lines and data lines. Another characteristic is that both the target bus 404 and the master bus 405 are fully synchronous. The target bus 404 and the master bus 405 are synchronous with respect to the clock of the external PCI bus 500. Signals on the target bus 404 and the master bus 405 are valid on only the rising edge of the clock. This demultiplexed, synchronous structure of both the target bus 404 and the master bus 405 enables the use of very simple data transfer protocols. The external PCI bus 500, in comparison, due to the complexity of the PCI bus specification, uses much more complex transfer protocols.

Another characteristic of the IC device 400 is that the master bus interface 401 supports a simple two signal line internal request/grant protocol, which can be similar in operation to the request/grant protocol used by the external PCI bus 500. The simple two signal line internal request/grant protocol is used by the internal bus interface units 406–409 to arbitrate for ownership of the target bus 404 and master bus 405. Another characteristic is that both the target bus 404 and the master bus 405 permit the transfer of data operands on successive clock edges, i.e., zero-wait-state transfers. This ensures data transfer bandwidth performance at least equal to that of external PCI bus 500. And yet another characteristic of IC device 400 is that the internal bus interface units 406–409 are used to interface each of the functional blocks 410–413 to the target bus 404 and/or the master bus 405. Thus, any unique tailoring requirements needed to adequately interface each of the functional blocks 410–413 to either the target bus 404, the master bus 405, or both, are designed into the internal bus interface units 406–409. The functional blocks 410–413 need not be designed to interface with the MBI 401 and TBI 402, which interface with the complex external PCI bus 500. Rather, the functional blocks 410–413 are designed to interface with the far more simple internal bus interface units 406–409, which interface to the simple, straight forward, target bus 404 and master bus 405.

It should be noted that the MBI 401, the TBI 402, and the CSU 403 separate the complexity of PCI bus interfacing from each of the functional blocks 410–413. The MBI 401, TBI 402, and CSU 403 perform all the multiplexing, demultiplexing, and interfacing with all the complex signals and protocols comprising the PCI bus specification. In addition, the MBI 401, TBI 402, and CSU 403 are not duplicated and are not tailored for each of the functional blocks 410–413. As such, the circuitry comprising the MBI 401, TBI 402, and CSU 403 can be thoroughly and robustly designed, tested, and optimized since it will only have to be done once, rather than duplicated and tailored for each new functional block. Placing the complex PCI bus interfacing circuitry in the MBI 401, TBI 402, and CSU 403 allows the structure of the internal busses (target bus 404 and master bus 405) to be very simple and efficient. Thus, the internal busses are purposely designed to facilitate easy interfacing and easy expansion.

Referring still to FIG. 4, the internal busses (target bus 404 and master bus 405) are designed to be very simple, easily extensible, and very easy to interface to. As described above, the internal busses are demultiplexed. As such, there is no complex multiplexing scheme required and no complex multiplexing and demultiplexing circuitry required. The internal busses are also synchronous, and therefore run in the same clock domain as the external PCI bus 500. The demultiplexed and synchronous internal busses are much easier to implement. Demultiplexing the internal busses enables the coupling of separate target and master busses (e.g., target bus 404 and master bus 405). The separate target and master busses provide for a very straight forward and simple extension. Additional functional blocks can be added to target bus 404 and master bus 405 until the signal loading on the internal busses becomes problematic. At such time, a second or even third pair of internal busses can be easily added (coupled to the same MBI 401, TBI 402, and CSU 403). The plurality of functional blocks are then divided among the internal busses to divide the signal loading effects. In this manner, the system of the present invention allows for very large numbers of functional blocks, e.g., easily 20 or more. Even with such expansion, the system of the present invention is still very efficient (zero-wait-state). In comparison, similarly extending a PCI bus, e.g., external PCI bus 500, due to the inherent complexity, is an expensive, difficult endeavor.

The internal bus interface units of IC device 400 are designed to interface functional blocks 410–413 to the target bus 404 and the master bus 405 (hereafter internal busses 404–405). The internal busses are demultiplexed and synchronous, as described above, and are thus, relatively easy to interface to. Designing internal bus interface units 406–409 consumes much less time than designing a common bus interface unit of the prior art, interfacing to a PCI bus. The MBI 401, TBI 402, and CSU 403 perform the majority of the work required to interface to the complex external PCI bus 500. Their circuitry is designed once and remains relatively unchanged through successive generations and versions of IC device 400. As described above, the circuitry comprising the MBI 401, TBI 402, and CSU 403 is fabricated into IC device 400 once, rather than being duplicated for each of the functional blocks 410–413. The tailoring required to interface each of the functional blocks 410–413 to the internal busses 404–405 is concentrated in each of the internal bus interface units 406–409.

The design of the internal bus interface units 406–409 vary for each of the functional blocks 410–413. It is desirable to be able to use designs for functional blocks essentially "as is" to promote easy reuse. In addition, concentrating the interfacing requirements in the internal bus interface units frees engineers from most of the confines of designing to a strict interface specification. Thus, designed "from scratch" functional blocks are just as easily accommodated by the system of the present invention as preexisting designs for functional blocks. The particularities of each of the functional blocks 410–413 are accounted for, and specifically designed to, in each of the internal bus interface units 406–409. The requirements of each of functional blocks 410–413, the differing configuration requirements, the differing target requirements, the differing master requirements, and the like, are tailored for in the internal bus interface units 406–409. Because the internal busses 404–405 are very simple and easy to interface to, designing each of internal bus interface units 406–409 is a much easier task than designing either common or individual bus interface units of the prior art. Because internal bus interface units 406–409 are comparatively simple to tailor, engineers are free to concentrate on the capabilities and circuitry of each of functional blocks 410–413. As described above, the system of the present invention accepts pre-existing functional blocks just as easily as newly designed functional blocks, and in essence provides for "drag and drop" multiple functional block device designing, wherein individual functional blocks are easily moved around and reconfigured to created new variations and generations of multiple functional block devices in accordance with the present invention. Separate functional blocks are able to be moved around and "dropped" into an overall design with only tailoring work on an internal bus interface unit.

Figure 5:
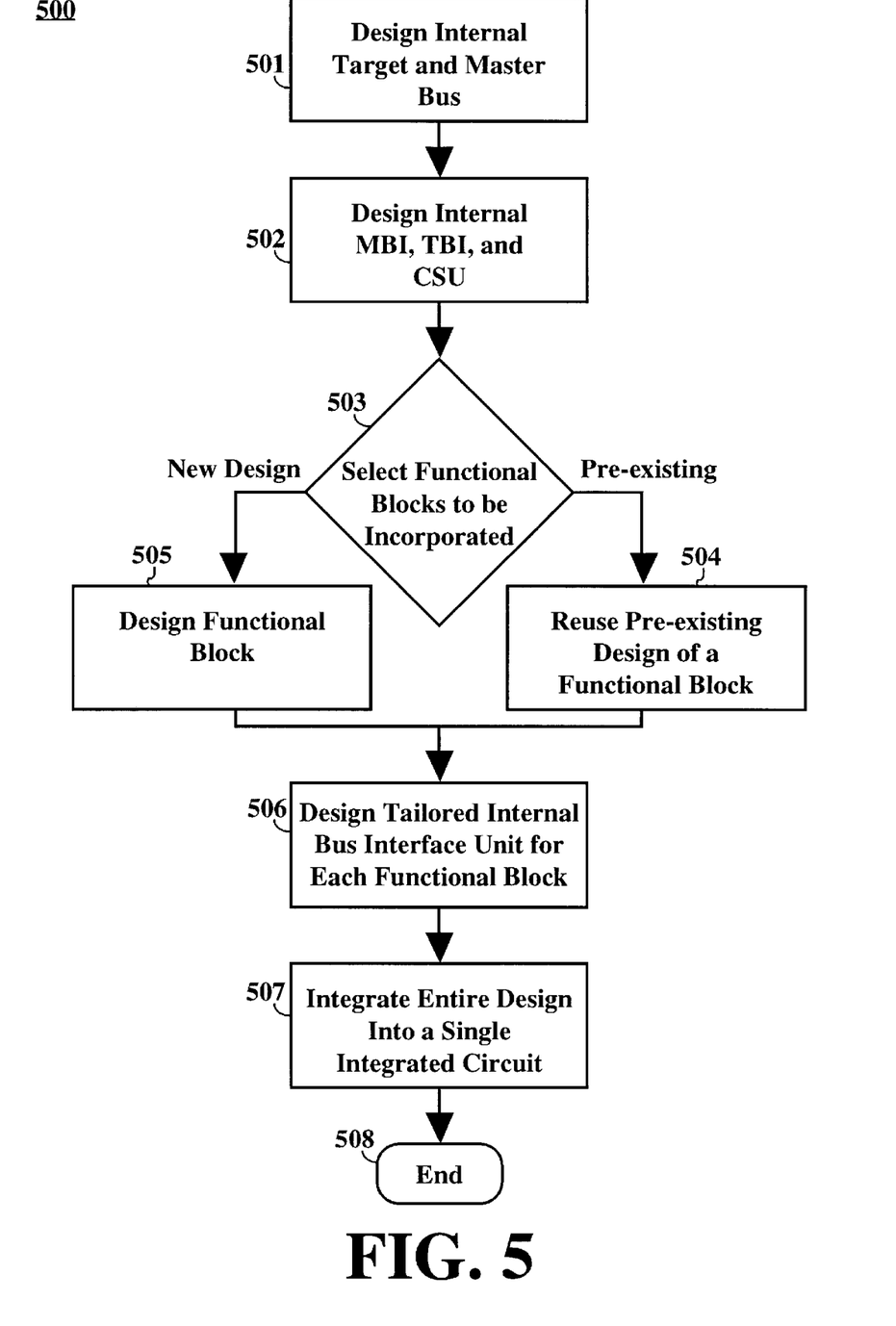
FIG. 5 shows a flow chart of the steps of a multiple functional block design process in accordance with one embodiment of the present invention.

Referring now to FIG. 5, a flow chart of the steps of a multiple functional block design process 500 in accordance with one embodiment of the present invention is shown. In step 501, internal target and master busses are designed. As described above, the internal target and master busses are demultiplexed, synchronous, easily extensible busses. In step 502, an internal master bus interface, an internal target bus interface, and an internal configuration space interface unit are designed. The master bus interface is coupled to the master bus and the target bus interface is coupled to the target bus. In step 503, the "drag and drop" step of the process 500, functional block designs are selected for incorporation. Typically, the designs for both pre-existing functional blocks and newly designed functional blocks exist in a design database structure stored in a computer system or upon computer readable media (e.g., disk archives). Engineers, in accordance with the present invention, select the functional blocks desired for incorporation into a multi-block device.

In step 504, where a pre-existing functional block design is selected for incorporation, the design data comprising the pre-existing functional block is "dragged" from the design database structure and "dropped" into the design of the overall system (the multiple functional block device being designed). The interfacing requirements and the pre-existing functional block particularities are handled in the design of an internal bus interface unit. In the case of a new functional block, in step 505, the new functional block is designed for incorporation. Because the tailoring and interfacing requirements are handled in the design of the internal bus interface unit, the engineer is free to concentrate on the capabilities and circuitry of the new functional block design. This enables new functional blocks to be designed in much less time than possible using prior art methods.

In step 506, an internal bus interface unit is designed to interface the functional block, whether a pre-existing functional block or a newly designed functional block, whether a target functional block or a master functional block, to the target and master busses. Master functional blocks are coupled by the internal bus interface units to both the target and master busses. Target functional blocks are coupled only to the target bus. The particularities and the specific requirements of each of functional block is satisfied by that functional block's corresponding internal bus interface unit, in the manner described above, such that any required tailoring work is substantially confined to the individual internal bus interface unit. In so doing, the capabilities of either pre-existing functional blocks or newly designed functional blocks are added to the overall system design with a minimal amount of effort. In step 507, the entire overall system design is integrated and fabricated into a single semiconductor integrated circuit. The integrated circuit is adapted to be coupled to an external PCI bus such that the master bus interface, the target bus interface, and the configuration space unit effectively couple the functional blocks to the external PCI bus. The process 500 subsequently ends in step 508.

Thus, the present invention provides a system for combining multiple functional blocks into a single IC in an efficient manner. The system of the present invention is easily extensible and capable of supporting a large number of on-chip functional blocks. The present invention facilitates the efficient reuse of existing functional block designs. Functional block designs require minimal tailoring for integration into a single multiple functional block system, permitting rapid design and fabrication of new multiple functional block devices.

Figure 6:
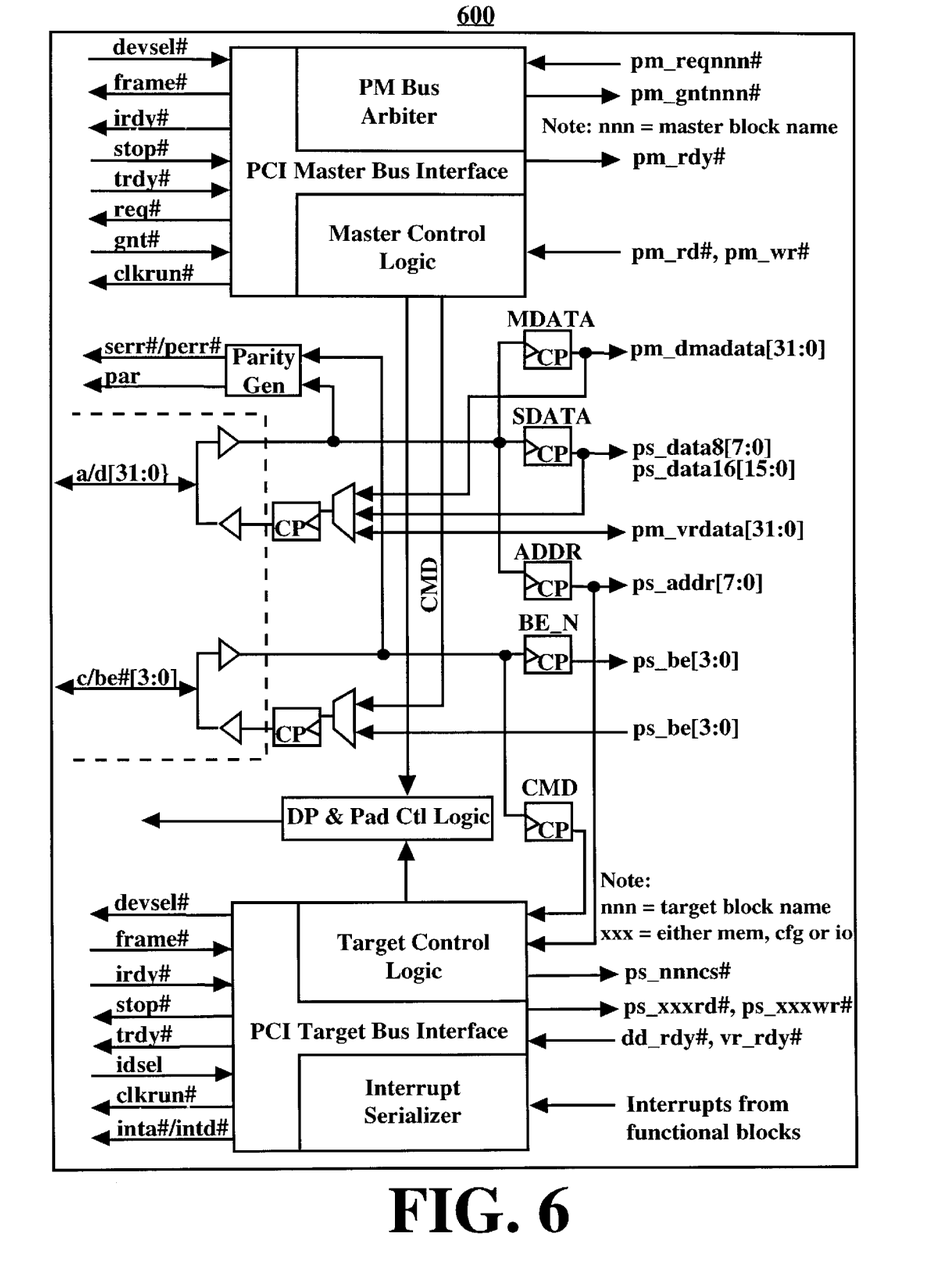
FIG. 6 shows a more detailed diagram of a portion of a multiple functional block device in accordance with one implementation of the present invention.

Referring now to FIG. 6, a more detailed diagram of a portion of a multiple functional block device 600, including a master bus interface, a target bus interface, and external PCI bus signal lines, in accordance with one implementation of the present invention is shown. It should be appreciated that device 600 is an exemplary implementation of the present invention. As such, the specific details, structures, signal lines, and the like illustrated in FIG. 6 are shown in order to provide a more detailed understanding of one implementation of the system of present invention, and thus, may vary with differing implementations of the system of the present invention. Signals shown on the right hand side of FIG. 6 comprise the industry standard PCI bus signals, signals shown on the left side of FIG. 6 comprise signals of the present implementation of the invention.

Referring still to FIG. 6, the target bus (hereafter PCI Slave Bus, or PS bus) is used for host or external PCI bus initiated transfers. It supports I/O, configuration, and memory cycles. The address and data busses are de-multiplexed from the external PCI a/d[31:0] bus. The PS bus is designed for burst transfers in either direction and can transfer data on each rising edge of the external PCI bus clock. As described above, the 32-bit data path of the PS bus simplifies configuration accesses and reduces the design complexity of the PCI master bus interface's master control logic. In FIG. 6 and in the following discussion, all PS bus signals use a "ps_" prefix.

All PS bus signals, except ps_data[31:0] and ps_rdy# are driven from the external PCI bus interface PS bus control logic. The PCI target bus interface initiates all PS bus cycles. Configuration cycles are started with the ps_cfgrd# or ps_cfgwr# signals. Memory and I/O cycles are started with the appropriate chip select line and one of the following as required: ps_iowr#, ps_iord#, ps_memrd#, ps_memrw#. The byte enables and address are always driven by the PCI target bus interface's target control logic. Data is driven depending upon whether the target functional block is either read from or written to. The selected functional block drives the signal, ps_rdy#, which indicates if the selected functional block is ready to receive data. Deasserting ps_rdy# during a cycle will insert wait-states into the data transfer. Data on this bus is transferred in a non-burst fashion only. See table 1 below for a description of the PS bus signals and their function.

TABLE 1

PS BUS SIGNAL DEFINITIONS

| SIGNAL | SIGNAL DEFINITION |
|---|---|
| ps_XXXcs# | PS chip selects:<br>The ps_XXXcs# signals are an active low collection of individual block/device selects where XXX represents some descriptive name of the block it enables accesses. The ps_XXXcs# signals are asserted by the PS bus control logic during valid I/O or memory read and write transactions on the PS bus. The PS chip selects should not be asserted during configuration cycles. Only one select line can be active per cycle to ensure the proper operation of the ps_rdy# signal. |
| ps_addr[7:0] | PS Address Bus:<br>The PS address bus is the bottom 8-bits of the PCI ad[31:0] bus and is used to individually address registers within the block. The address is valid for I/O, memory and configuration cycles. It is driven by the PCI data path logic and is valid at some gate delay after frame# is first detected asserted. |
| ps_data[31:0] | PS Data Bus:<br>The PS data is bi-directional bus de-multiplexed from the |

TABLE 1-continued

PS BUS SIGNAL DEFINITIONS

| SIGNAL | SIGNAL DEFINITION |
|---|---|
| | PCI AD bus. This bus is 32 bits wide to simplify the PS bus control logic. Data steering will be performed as required on the target device. If desired, target bursting is possible on this bus. |
| ps_be#[3:0] | PS Byte Enables:<br>The ps_be# bus is the de-multiplexed version of the PCI c/be#[3:0] bus. The PS byte enables are driven by the PS bus control logic and signal which bytes on the internal PS data bus are valid. Note that a valid cycle can be sent with all byte enables deasserted. |
| ps_iowr# | PS I/O Write Strobe:<br>The PS I/O write strobe signals an I/O write access decoded from the PCI bus. It is driven by the PS bus control logic and is valid one PCI clock after the bus command is decoded. |
| ps_iord# | PS I/O Read Strobe:<br>The PS I/O read strobe signals an I/O read access decoded from the PCI bus. It is driven by the PS bus control logic and is valid one PCI clock after the bus command is decoded. |
| ps_cfgwr# | PS Configuration Write Strobe:<br>The PS configuration write strobe signals an configuration write access decoded from the PCI bus. It is driven by the PS bus control logic and is valid one PCI clock after the bus command is decoded. |
| ps_cfgrd# | PS Configuration Read Strobe:<br>The PS configuration read strobe signals an configuration read access decoded from the PCI bus. It is driven by the PS bus control logic and is valid one PCI clock after the bus command is decoded. |
| ps_memwr# | PS Memory Write Strobe:<br>The PS memory write strobe signals an memory write access decoded from the PCI bus. It is driven by the PS bus control logic and is valid one PCI clock after the bus command is decoded. |
| ps_memrd# | PS Memory Read Strobe:<br>The PS memory read strobe signals an memory read access decoded from the PCI bus. It is driven by the PS bus control logic and is valid one PCI clock after the bus command is decoded. |
| ps_rdy# | PS Device Ready:<br>The PS device ready signal is used to signal the acceptance or insert wait states of an I/O, configuration or memory cycle. A transfer is completed only when a command strobe, device chip select (for I/O and memory devices only) and ps_rdy# are both active at a rising clock edge. PS device ready can be used to delay the completion of a cycle if writing to a slow peripheral or a mailbox register that is currently being read. Fast devices need never deassert this signal. |

Referring still to FIG. 6, the internal master bus (hereafter PCI master bus or PM bus) is used to transfer data to and from the internal master functional blocks (not shown). An arbiter, PM bus arbiter, located in the PCI master bus interface is required since there are multiple internal master functional blocks. All PM bus signals use the "pm_" prefix.

It should be noted that there are several key points to be aware of when designing devices that connect to the PM bus, in accordance with the present invention. First, internal arbitration must take place between master functional blocks to resolve priority and deadlock. Second, all transfers are designed to be burst transfers and will be unbuffered in the PCI interface to the external PCI bus (not shown). If buffering is required, the bus mastering functional block should incorporate it. Third, the pm_rdy# signal is not meant, nor should be used, to insert wait states in the data transfer.

A master functional block first requests the PM bus by asserting its particular request line. Next, the PM bus arbiter will provide an internal grant. At this point, the granted master functional device begins driving the address and byte enable signals onto the PM bus. The PM bus then waits for the PCI master bus interface to receive a grant from the master arbiter. Once a grant is received, the PCI master bus interface asserts frame# and begins the data transfer to or from system memory.

The master functional blocks can request the PM bus simultaneously. If this occurs, in the present implementation of the invention, the PM bus arbiter will arbitrate the PM bus to the "NOT(LAST_MASTER)" condition, or to any master functional block that did not use the last bus transaction. The master functional blocks cannot retry or "drop" cycles. If a master is dropped or disconnected, it should initiate another transfer, continuing from the transfer where it was dropped or disconnected. This guarantees no deadlock or "master starvation" conditions occur. If priority among master functional blocks is desired, additional logic for a programmable priority internal arbiter should be added. See table 2 below for a description of the PM bus signals and their function.

TABLE 2

PM BUS SIGNAL DEFINITIONS

| SIGNAL | SIGNAL DEFINITION |
|---|---|
| pm_addr[31:0] | PM Address Bus:<br>The PM address bus is driven by the internal master device that has received an internal grant from the local arbiter. The only address that is present on this bus is the starting address of the requested transfer. The address shall remain valid on the bus until the entire transfer has been completed. |
| pm_data[31:0] | PM Data Bus:<br>This bi-directional 32-bit data bus transfers all data in a burst fashion to and from the internal bus masters. Care should be taken in the loading of this bus to enable valid data to be clocked on each rising edge of the PCI clock. |
| pm_be#[3:0] | PM Byte Enables:<br>The PM byte enable bus is driven by the acknowledged master to determine which bytes are valid for all read and write transfers. The byte enables must remain valid for each data phase. Note that all byte enables may be deasserted during an active data phase. |
| pm_wr# | PM Write Strobe:<br>The PM write strobe is generated by the granted bus master and is encoded into the PCI command nibble by the PM bus control logic. When this signal is asserted the granted master drives data and byte enables onto the internal PM bus. |
| pm_rd# | PM Read Strobe:<br>The PM read strobe is generated by the granted bus master and is encoded into the PCI command nibble by the PM bus control logic. When this signal is asserted the granted master is ready to accept data from the PM internal bus. |
| pm_rdy# | PM Device Ready:<br>This signal is used to signal the acceptance of a cycle. A transfer is completed only when both a command and pm_rdy# are both active at a rising clock edge. |
| pm_reqnn# | PM Request Line:<br>This is the master request line and is used to signal the PCI interface to initiate a Master PCI cycle. |
| pm_gntnn# | PM Grant Line:<br>This is the grant that is used to acknowledge the requesting block to begin reading or writing data onto the PM data bus. The grant line also indicates which block master has been selected for data transfers. The selected master block will then drive the PM control signals (i.e., pm_addr[31:0], pm_be#[3:0], pm_wr#, pm_rd#, pm_rdy#, and pm_data[31:0] during write cycles). |

Figure 7:
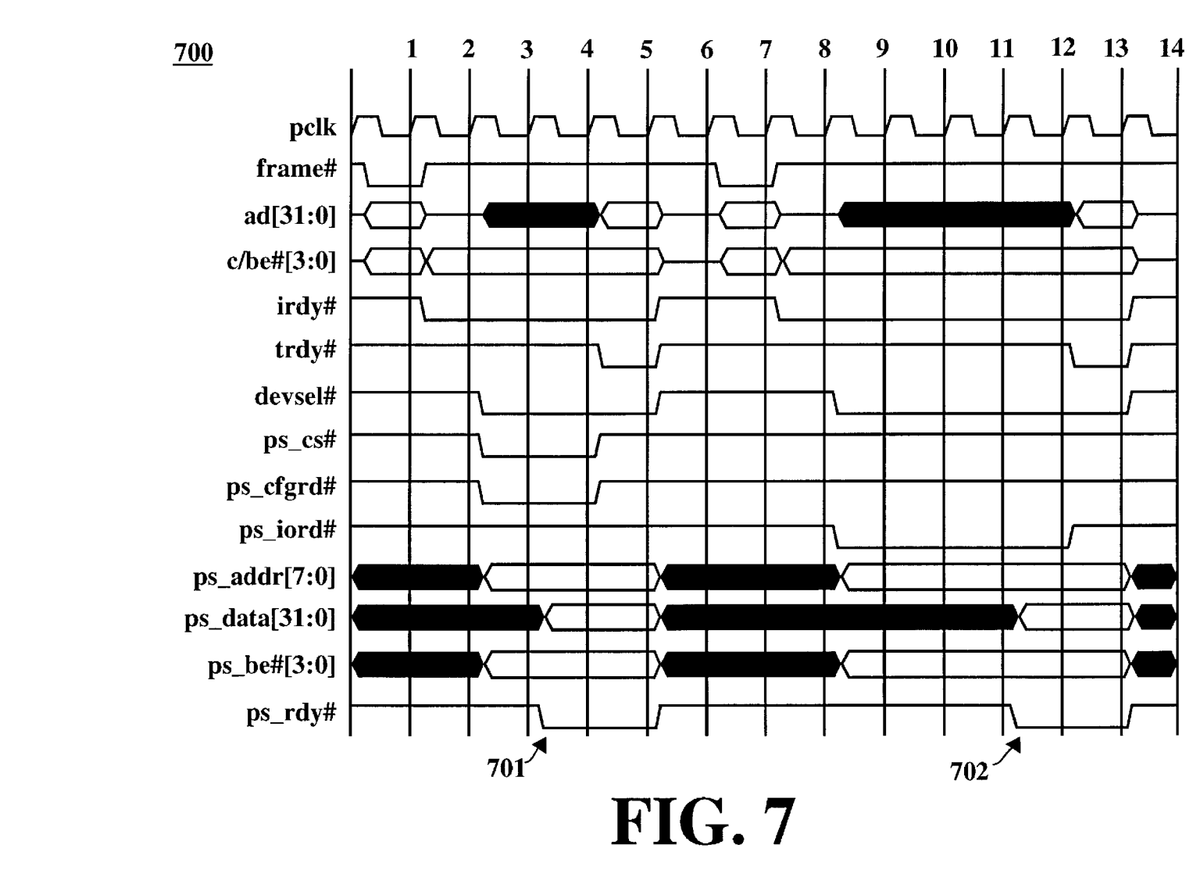
FIG. 7 shows an exemplary internal target bus read timing diagram in accordance with one implementation of the present invention.

Referring now to FIG. 7, an exemplary internal target bus read timing diagram 700 is shown. Timing diagram 700 shows two data transactions with an internal target functional block. The first transaction, shown by the first assertion of ps_rdy#, (line 701) is a configuration read access. This is shown by the assertion of ps_cfgrd# on the rising edge of clock cell 2. On the rising edge of clock cell 5, the configuration read is complete. The second transaction is a internal target read transaction, shown by the second assertion of ps_rdy# (line 702). The ps_iord# signal is asserted on the rising edge of dock cell 8. On the rising edge of clock cell 13, coincident with the deassertion of trdy#, the second transaction is complete.

Figure 8:
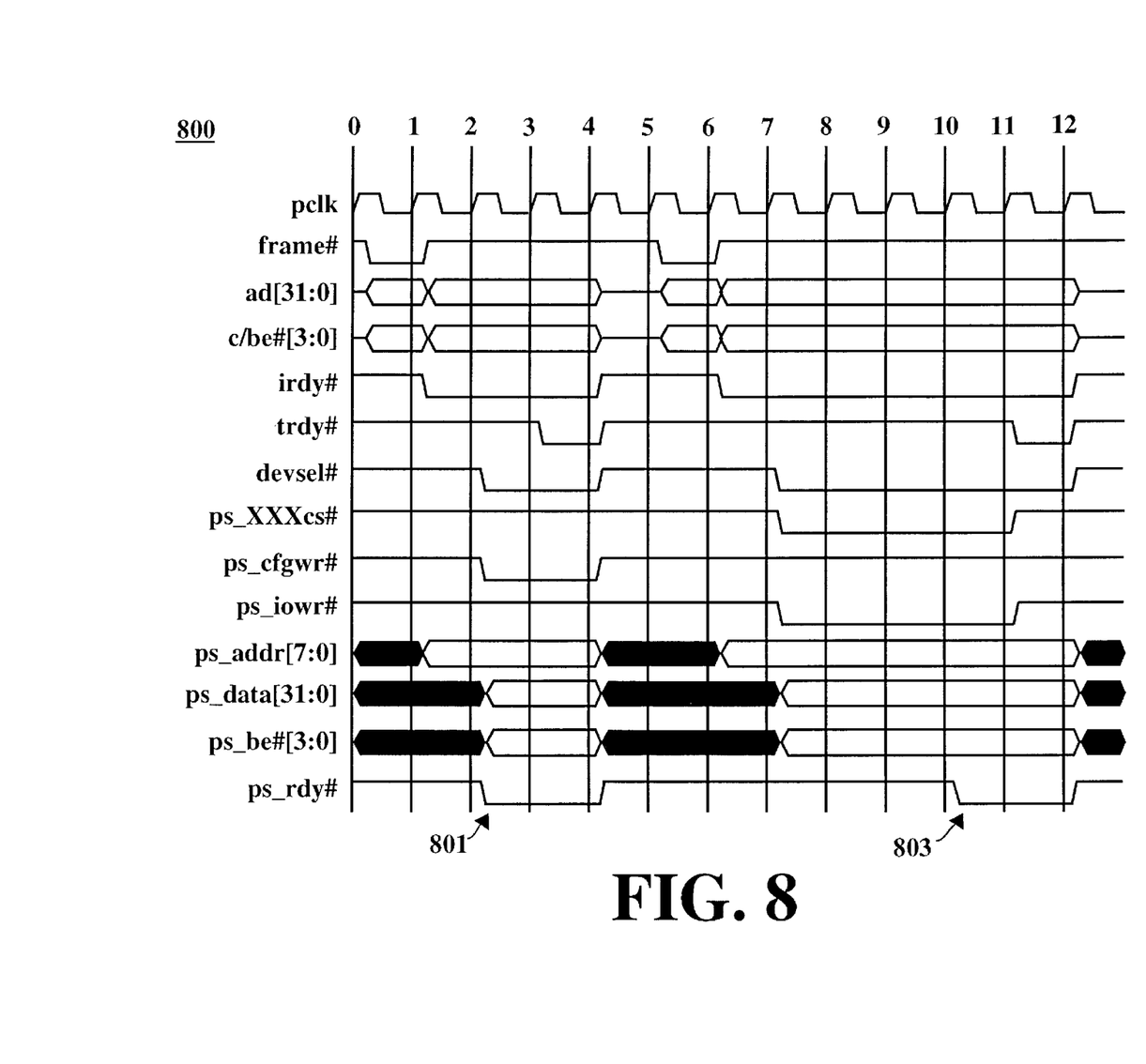
FIG. 8 shows an exemplary internal target bus write timing diagram in accordance with one implementation of the present invention.

Referring now to FIG. 8, an exemplary internal target bus write timing diagram 800 is shown. Timing diagram 800 shows two data transactions with the internal target functional block. The first transaction, shown by the first assertion of ps_rdy#, (line 801) is a configuration write access. This is shown by the assertion of ps_cfgwr# on the rising edge of clock cell 2. On the rising edge of clock cell 4, coincident with the deassertion of trdy#, the configuration write is complete. The second transaction is a target write transaction, shown by the second assertion of ps_rdy# (line 802). The ps_iowr# is asserted on the rising edge of clock cell 7. On the rising edge of clock cell 12, coincident with the deassertion of ps_rdy#, the second transaction is complete.

Figure 9:
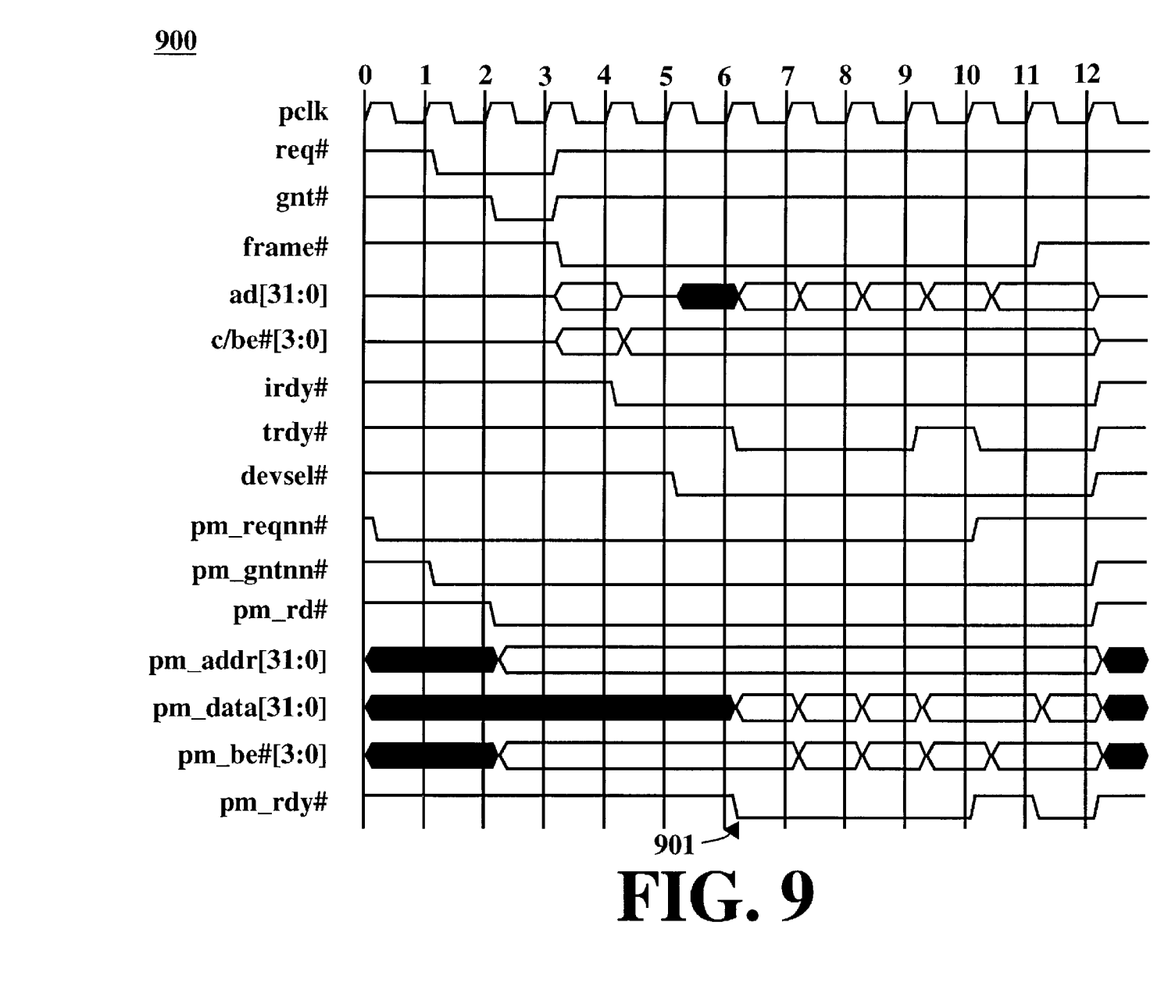
FIG. 9 shows an exemplary internal master bus read transaction timing diagram in accordance with one implementation of the present invention.

Referring now to FIG. 9, an exemplary internal master bus read transaction timing diagram 900 is shown. The internal master functional block must first arbitrate for, and be granted, ownership of the internal master bus. On the rising edge of clock cell 1, the master functional block asserts pm_reqnn#, signaling a request for bus ownership to the master bus interface unit. Upon receiving the request from the internal master functional block, the master bus interface asserts req# on the external PCI bus, requesting ownership of the external PCI bus. In the present implementation, the internal grant signal pm.gntnn# is asserted predictively, i.e., before the return of the grant signal gnt# from an external arbiter on the external PCI bus. The internal master functional block assets the pm_rd# on the rising edge of clock cell 2 to indicate a read transaction is beginning. The internal master functional block signals its readiness to begin the data transaction by asserting pm_rdy# on the rising edge of clock cell 6 (line 901). The transaction is complete on the rising edge of clock cycle 12 coincident with the deassertion of the pm_rdy# signal, one clock cycle after the deassertion of frame#.

Figure 10:
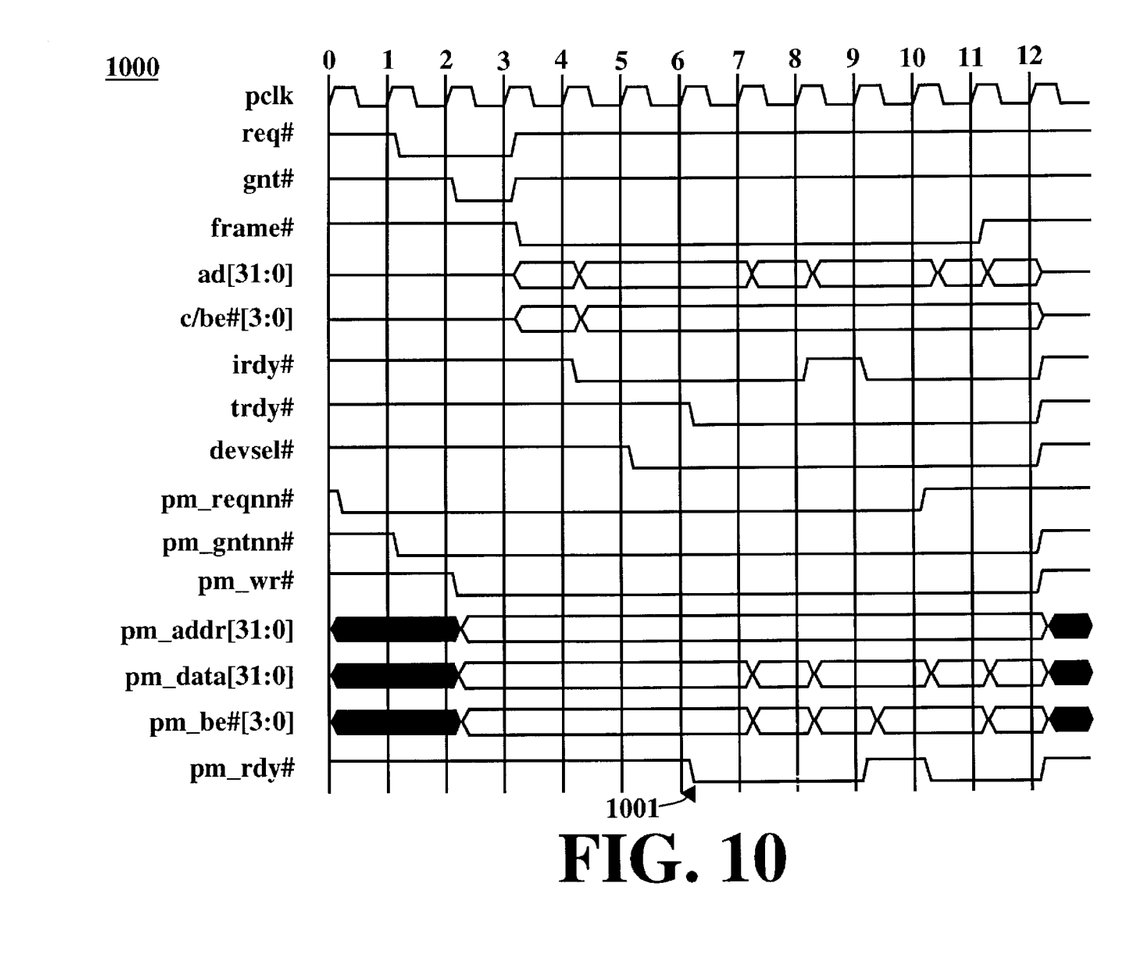
FIG. 10 shows an exemplary internal master bus write transaction timing diagram 1000 in accordance with one implementation of the present invention.

Referring now to FIG. 10, an exemplary internal master bus write transaction timing diagram 1000 is shown. First, as described above, the internal master functional block must arbitrate for, and be granted, ownership of the internal master bus. On the rising edge of dock cell 1, the master functional block asserts pm_reqnn#, signaling a request for bus ownership to the master bus interface unit. Upon receiving the request from the internal master functional block, the master bus interface asserts req# on the external PCI bus, requesting ownership of the external PCI bus, on the rising edge of clock cell 2. In the present implementation, as described above, the internal grant signal pm_gntnn# is asserted predictively, i.e., before the return of the grant signal gnt# from an external arbiter on the external PCI bus. The internal master functional block asserts the pm_wr# signal on clock cell 2 to indicate a write transaction. The internal master functional block signals its readiness to begin the data transaction by asserting pm_rdy# on the rising edge of clock cell 6 (line 1001). The transaction is complete on the rising edge of clock cycle 12 coincident with the deassertion of the pm_rdy# signal, one clock cycle after the deassertion of frame#.

The present invention, a method and system for and extensible on silicon bus supporting multiple functional blocks, is thus described. While the present invention has been described in particular embodiments, it should be appreciated that the present invention should not be construed as limited by such embodiments, but rather construed according to the below claims.

What is claimed is:

1. A multiple functional block integrated circuit device for connecting to an external peripheral component interconnect (PCI) bus, comprising:

an integrated circuit adapted to be coupled to an external PCI bus;

a plurality of functional blocks integral with said integrated circuit, each of said plurality of functional blocks for performing a function, each of said plurality of functional blocks comprising either a master functional block or a target functional block or both;

a target bus integral with said integrated circuit, said target bus adapted to transmit data signals thereon, said target bus coupled to each of said plurality of functional blocks;

a master bus integral with said integrated circuit, said master bus adapted to transmit data signals thereon, said master bus coupled to said each master functional block of said plurality of functional blocks;

a target bus interface integral with said integrated circuit and coupled to said target bus, said target bus interface adapted to be coupled to said external PCI bus, said target bus interface coupled to each of said plurality of functional blocks via said target bus and adapted to interface each of said plurality of functional blocks to said external PCI bus; and a master bus interface integral with said integrated circuit and coupled to said master bus, said master bus interface adapted to be coupled to said external PCI bus, said master bus interface coupled to said each master functional block of said plurality of functional blocks via said master bus and adapted to interface each master functional block to said external PCI Bus.

2. The multiple functional block integrated circuit device of claim 1, further comprising:

a plurality of internal bus interface units integral with said integrated circuit, each of said plurality of bus interface units respectively coupled to each of said plurality of functional blocks, such that said plurality of functional blocks are interfaced with said target bus and such that said each master functional block is interfaced with said master bus.

3. The multiple functional block integrated circuit device of claim 1, further comprising:

a configuration space unit integral with said integrated circuit, said configuration space unit adapted to configure said plurality of functional blocks with said external PCI bus.

4. The multiple functional block integrated circuit device of claim 1, wherein said master bus interface further includes an arbiter for arbitrating among said each master functional block for ownership of said master bus.

5. The multiple functional block integrated circuit device of claim 1, wherein:

said master bus is demultiplexed and said master bus is synchronous with said external PCI bus; and said target bus is demultiplexed and said target bus is synchronous with said external PCI bus.

6. The multiple functional block integrated circuit device of claim 1, further comprising:
   a plurality of target busses integral with said integrated circuit, each of said plurality of target busses adapted to transmit data signals thereon, each of said target busses coupled to a respective plurality of functional blocks and coupled to said target bus interface such that an amount of signal loading from said respective plurality of functional blocks is divided among said plurality of target busses; and
   a plurality of master busses integral with said integrated circuit, each of said plurality of master busses adapted to transmit data signals thereon, each of said master busses coupled to each master functional block of said respective plurality of functional blocks and coupled to said master bus interface such that an amount of signal loading from said respective plurality of functional blocks is divided among said plurality of master busses.

7. The multiple functional block integrated circuit device of claim 1, wherein each said plurality of functional blocks comprise either a newly designed functional block or a functional block from a pre-existing design.

8. A peripheral component interconnect (PCI) bus system including a multiple functional block integrated circuit device, comprising:
   a PCI bus adapted to transmit data signals thereon;
   an integrated circuit adapted to be coupled to said PCI bus;
   a plurality of functional blocks integral with said integrated circuit, each of said plurality of functional blocks for performing a function, each of said plurality of functional blocks comprising either a master functional block or a target functional block or both;
   a target bus integral with said integrated circuit, said target bus adapted to transmit data signals thereon, said target bus coupled to each of said plurality of functional blocks;
   a master bus integral with said integrated circuit, said master bus adapted to transmit data signals thereon, said master bus coupled to said each master functional block of said plurality of functional blocks;
   a target bus interface integral with said integrated circuit and coupled to said target bus, said target bus interface adapted to be coupled to said PCI bus, said target bus interface coupled to each of said plurality of functional blocks via said target bus and adapted to interface each of said plurality of functional blocks to said PCI bus; and
   a master bus interface integral with said integrated circuit and coupled to said master bus, said master bus interface adapted to be coupled to said PCI bus, said master bus interface coupled to said each master functional block of said plurality of functional blocks via said master bus and adapted to interface each master functional block to said PCI Bus.

9. The multiple functional block integrated circuit device of claim 8, further comprising:
   a plurality of internal bus interface units integral with said integrated circuit, each of said plurality of bus interface units respectively coupled to each of said plurality of functional blocks, such that said plurality of functional blocks are interfaced with said target bus and such that said each master functional block is interfaced with said master bus.

10. The multiple functional block integrated circuit device of claim 8, further comprising:
   a configuration space unit integral with said integrated circuit, said configuration space unit adapted to configure said plurality of functional blocks with said PCI bus.

11. The multiple functional block integrated circuit device of claim 8, wherein said master bus interface further includes an arbiter for arbitrating among said each master functional block for ownership of said master bus.

12. The multiple functional block integrated circuit device of claim 8, wherein:
   said master bus is demultiplexed and said master bus is synchronous with said PCI bus; and
   said target bus is demultiplexed and said target bus is synchronous with said PCI bus.

13. The multiple functional block integrated circuit device of claim 8, further comprising:
   a plurality of target busses integral with said integrated circuit, each of said plurality of target busses adapted to transmit data signals thereon, each of said target busses coupled to a respective plurality of functional blocks and coupled to said target bus interface such that an amount of signal loading from said respective plurality of functional blocks is divided among said plurality of target busses; and
   a plurality of master busses integral with said integrated circuit, each of said plurality of master busses adapted to transmit data signals thereon, each of said master busses coupled to each master functional block of said respective plurality of functional blocks and coupled to said master bus interface such that an amount of signal loading from said respective plurality of functional blocks is divided among said plurality of master busses.

14. The multiple functional block integrated circuit device of claim 8, wherein each said plurality of functional blocks comprise either a newly designed functional block or a functional block from a pre-existing design.

15. A method of combining a plurality of functional blocks into an integrated circuit device for connecting to a PCI bus, the method comprising the steps of:
   a) designing a target bus;
   b) designing a master bus;
   c) designing a master bus interface and a target bus interface, wherein said master bus interface will interface said master bus to a PCI bus and said target bus interface will interface said target bus to said PCI bus;
   d) selecting a plurality of functional block designs wherein each of said plurality of functional block designs comprise either a target functional block design or a master functional block design;
   e) coupling each selected master functional block design of said plurality of functional block designs to said master bus;
   f) coupling each of said plurality of functional block designs to said target bus; and
   g) fabricating said target bus, said master bus, said master bus interface, said target bus interface, and said plurality of functional block designs into a multiple functional block integrated circuit device.

16. The method of claim 15, further including the steps of:
   designing an internal bus interface unit for each of said plurality of functional block designs; and
   tailoring said internal bus interface units to accommodate requirements of each of said plurality of functional block designs.

17. The method of claim 15, wherein step d) further includes the step of selecting a pre-existing functional block design for incorporation into said multiple functional block integrated circuit device.

18. The method of claim 15, wherein step d) further includes the step of selecting a newly designed functional block design for incorporation into said multiple functional block integrated circuit device.

* * * * *